(12) United States Patent
Poswal et al.

(10) Patent No.: US 11,599,328 B2
(45) Date of Patent: Mar. 7, 2023

(54) METHODS AND SYSTEMS FOR PLAYING AN AUDIO CORRESPONDING TO A TEXT MEDIUM

(71) Applicant: Disney Enterprises, Inc., Burbank, CA (US)

(72) Inventors: Mohammad Poswal, Santa Clarita, CA (US); Giovanna Alaimo, North Hollywood, CA (US); Malcolm Murdock, Los Angeles, CA (US); Richard Ginter, Valencia, CA (US); Taylor Hellam, Fresno, CA (US)

(73) Assignee: Disney Enterprises, Inc., Burbank, CA (US)

( * ) Notice: Subject to any disclaimer, the term of this patent is extended or adjusted under 35 U.S.C. 154(b) by 60 days.

(21) Appl. No.: 14/721,793

(22) Filed: May 26, 2015

(65) Prior Publication Data

US 2016/0350066 A1 Dec. 1, 2016

(51) Int. Cl.
G06F 17/00 (2019.01)
G06F 3/16 (2006.01)

(52) U.S. Cl.
CPC ................... *G06F 3/165* (2013.01)

(58) Field of Classification Search
CPC ....................................... G06F 3/165
USPC ............................................. 700/94
See application file for complete search history.

(56) References Cited

U.S. PATENT DOCUMENTS

| | | | |
|---|---|---|---|
| 6,964,374 B1 * | 11/2005 | Djuknic | G06F 17/30879 235/462.01 |
| 6,975,832 B2 * | 12/2005 | Adams | B42D 1/08 281/31 |
| 8,832,374 B1 * | 9/2014 | Schaefers | H04L 67/1097 711/115 |
| 9,182,940 B1 * | 11/2015 | Chen | G06F 3/16 |
| 9,188,976 B1 * | 11/2015 | Kim | G06F 21/10 |
| 9,317,486 B1 * | 4/2016 | Story, Jr. | G06K 9/00442 |
| 2002/0184189 A1 * | 12/2002 | Hay | G06Q 30/06 707/999.001 |
| 2008/0141180 A1 * | 6/2008 | Reed | G06F 17/30017 715/854 |
| 2010/0070573 A1 * | 3/2010 | Olson | G06Q 10/10 709/203 |
| 2010/0235741 A1 * | 9/2010 | Newman | G06F 9/542 715/716 |

(Continued)

OTHER PUBLICATIONS

Audiobook Wikipedia page (Year: 2015).*

*Primary Examiner* — Paul C McCord
(74) *Attorney, Agent, or Firm* — Farjami & Farjami LLP

(57) ABSTRACT

There is provided a media player device for use with a text medium having a plurality of pages each having a plurality of words, the media player device comprising an audio output, a memory storing a text medium application software; and a processor configured to execute the text medium application software to receive a first signal emitted from a wireless communication element embedded in the text medium, the first signal including a text medium ID uniquely identifying the text medium, and play an audio, via the audio output and in response to receiving the text medium ID, wherein the audio corresponds to the text medium ID and the audio pronounces the plurality of words in a same sequence appearing in each of the plurality of pages.

18 Claims, 7 Drawing Sheets

(56) References Cited

U.S. PATENT DOCUMENTS

| | | | |
|---|---|---|---|
| 2011/0153330 A1* | 6/2011 | Yazdani | G10L 13/00 704/260 |
| 2011/0175805 A1* | 7/2011 | Rottier | G09G 5/00 345/156 |
| 2011/0208614 A1* | 8/2011 | Tom | G06Q 30/0641 704/235 |
| 2011/0301728 A1* | 12/2011 | Hamilton | G11B 27/034 700/94 |
| 2013/0080516 A1* | 3/2013 | Bologh | H04N 21/26216 709/203 |
| 2013/0134213 A1* | 5/2013 | Pallakoff | G06Q 30/00 235/375 |
| 2013/0145265 A1* | 6/2013 | Cunningham | B42D 9/007 715/716 |
| 2013/0268851 A1* | 10/2013 | Joo | G06F 17/24 715/255 |
| 2013/0332167 A1* | 12/2013 | Kilgore | H04M 3/567 704/251 |
| 2013/0333055 A1* | 12/2013 | Pallakoff | H04L 63/10 726/29 |
| 2014/0047253 A1* | 2/2014 | Kim | G10L 19/00 713/320 |
| 2014/0082467 A1* | 3/2014 | Yoon | G06F 17/21 715/202 |
| 2014/0115436 A1* | 4/2014 | Beaver | G06F 40/197 715/229 |
| 2014/0118800 A1* | 5/2014 | Hwang | H04N 1/00331 358/474 |
| 2014/0215340 A1* | 7/2014 | Shetty | G06F 3/0488 715/727 |
| 2014/0270306 A1* | 9/2014 | Luna | G01S 11/06 381/334 |
| 2014/0282751 A1* | 9/2014 | Lee | H04N 21/4622 725/80 |
| 2015/0189461 A1* | 7/2015 | Pang | H04W 4/008 455/41.1 |
| 2015/0324331 A1* | 11/2015 | Tredoux | G06F 17/21 715/274 |
| 2016/0232538 A1* | 8/2016 | Papakostas | G06Q 30/0201 |

\* cited by examiner

METHODS AND SYSTEMS FOR PLAYING AN AUDIO CORRESPONDING TO A TEXT MEDIUM

BACKGROUND

Children enjoy read-along books, which allow them to listen to an audio of a book while they follow along in a corresponding book. However, conventional approaches to read-along books require one to be in possession of a CD or a cassette, which includes the audio of the corresponding book. In addition, a child may not be able to find a matching CD or cassette for a book, and may not be able to operate a CD or a cassette player for playing the matching CD or cassette. Further, a CD or a cassette may be lost, damaged or misplaced, especially at the hands of children. Even more, conventional approaches to read-along books or books on CDs require a child or an adult to remember at which point during the audio was previously stopped for the purpose of re-starting the audio at a later time.

SUMMARY

The present disclosure is directed to systems and methods for playing an audio corresponding to a text medium, substantially as shown in and/or described in connection with at least one of the figures, as set forth more completely in the claims.

DETAILED DESCRIPTION

Figure 1:
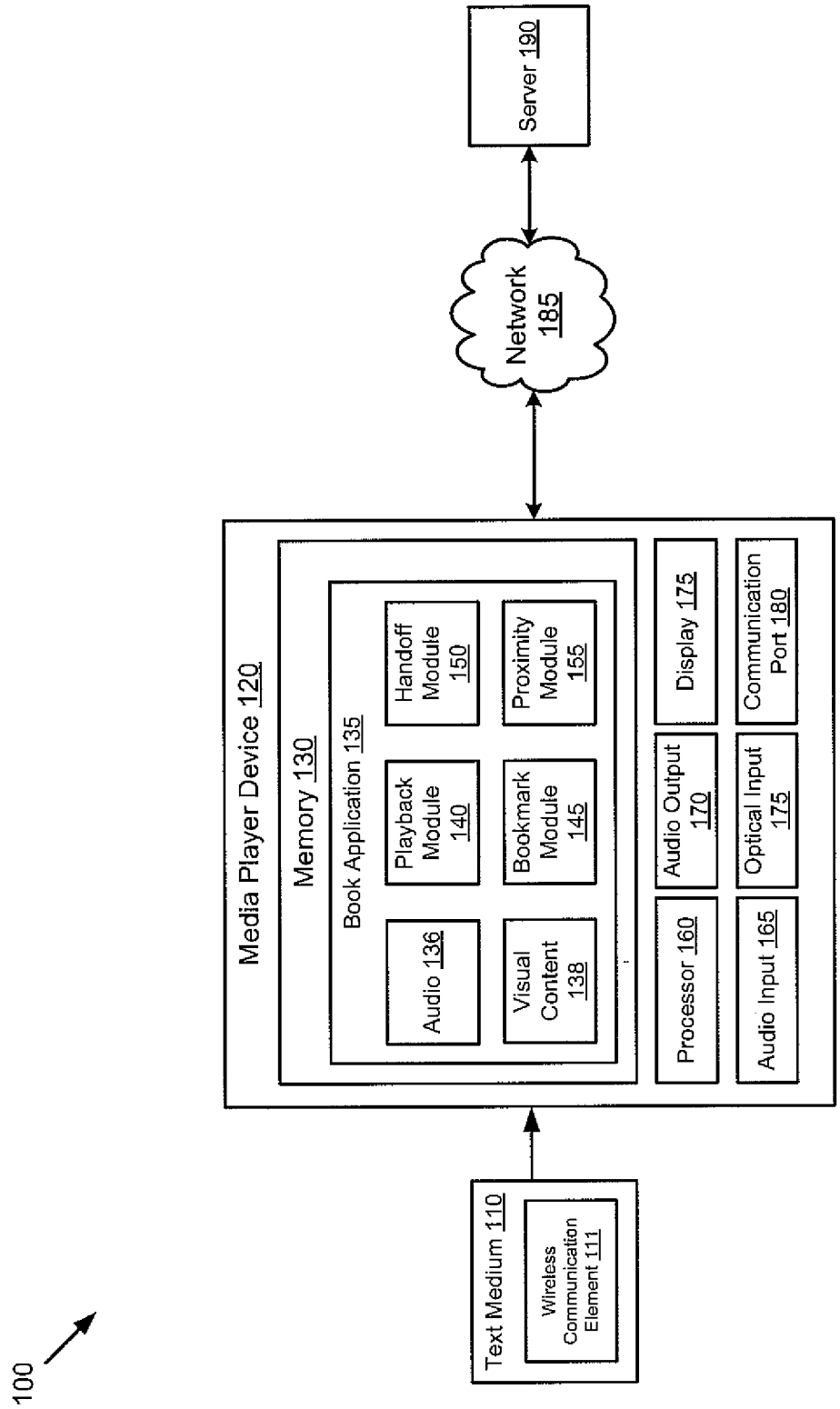
FIG. 1 shows a diagram of an exemplary media player device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary media player device, according to one implementation of the present disclosure. Diagram 100 shows text medium 110, media player device 120, network 185, and server 190. As shown in FIG. 1, text medium 110 includes wireless communication element 111, and may be connectable to media player device 120, which may be connected to server 190 through network 185.

Text medium 110 may be a printed book, magazine or newspaper having a plurality of pages, and each page may have a word or a plurality of words printed thereon. In some implementations, text medium 110 may be an electronic book, magazine, or newspaper and have a plurality of electronic pages with each page including a word or a plurality of words of text. As shown in FIG. 1, text medium 110 includes wireless communication element 111. Text medium 110 may include a switch to activate wireless communication element 111 and/or turn wireless communication element 111 on and off. In some implementations, the switch may be embedded in the cover of text medium 110 and opening the cover may operate the switch. The switch may include a mechanical angle slider that is operated by opening the cover of text medium 110, a mechanical switch operated by opening the cover of text medium 110, a proximity switch operated by opening the cover of text medium 110, or any other switch suitable for activating wireless communication element 111.

Wireless communication element 111 may be a suitable device for communicating a text medium ID. Wireless communication element 111 may be a device for transmitting a wireless signal. In some implementations, wireless communication element 111 may be a radio frequency transmitter, such as an active or passive radio frequency identification (RFID) transmitter. In some implementations, wireless communication element 111 may be a near field communication (NFC) transmitter, or a short distance radio transmitter. Short distance radio transmissions may operate in the unlicensed industrial, scientific and medical (ISM) band at 2.4 to 2.485 GHz using a spread spectrum, frequency hopping, full-duplex signal at a nominal rate of 1600 hops/sec., e.g. a Bluetooth® (BT) transmitter. In some implementations, wireless communication element 111 may be a BT transmitter or a Bluetooth® low energy (BLE) transmitter, where BLE transmitters include, among other things, Bluetooth® Smart and iBeacon™ transmitters. In some implementations, text medium 110 does not need to be paired with media player device 120, for example, when text medium 110 and media player device 120 implement BLE technology.

In some implementations, wireless communication element 111 may be a graphic for scanning by media player device 120. For example, text medium 110 may include a barcode that may be scanned by a scanner of media player device 120. In some implementations, media player device 120 may use a camera to capture an image of a part of text medium 110, e.g., the cover of a book or a barcode. Media player device 120 may use the captured image to uniquely identify text medium 110. In some implementations, wireless communication element 111 may include an audio transmitter for transmitting an audible or inaudible signal including the text medium IDS for detection by audio input 165 of media player device 120.

Wireless communication element 111 may be included in text medium 110. For example, wireless communication element 111 may be a wireless transmitter embedded in a cover of text medium 110, in a spine of text medium 110, or in another location suitable for embedding wireless communication element 111 in text medium 110. In some implementations, wireless communication element 111 may transmit a text medium ID uniquely identifying text medium 110. In some implementations, the text medium ID may be included in a graphic of text medium 110, such as a scannable barcode, or part of all of an image, and the text medium ID may be communicated to media player device 120 using optical input 175.

In some implementations, media player device 120 or server 190 may use the text medium ID to identify an audio corresponding to text medium 110. Wireless communication element 111 may transmit a corresponding signal, such as an RFID signal, an NFC signal, a BT signal, or a BLE signal. Wireless communication element 111 may continuously transmit the signal, or wireless communication element 111 may intermittently transmit the signal, for example, as an intermittent ping.

Media player device 120, as shown in FIG. 1, includes memory 130, processor 160, audio output 170, display 175, and communication port 180. Memory 130 is a hardware storage device capable of storing commands, processes, and programs for execution by processor 160. Memory 130 is a non-transitory storage device capable of storing data, commands, processes, and programs for execution by processor 160. As shown in FIG. 1, memory 130 includes text medium application 135, which includes audio 136, visual content 138, playback module 140, bookmark module 145, handoff module 150, and proximity module 155, and may include optical input 175, such as a camera, and audio input 165, such as a microphone.

Audio 136 may include an audio recording corresponding to the words on each page of text medium 110. In some embodiments, audio 136 may include an audible page-turn indicator following the last word on a page of text medium 110, the audible page-turn indicator used to indicate to a user that it is time to turn to the next page of text medium 110. In some implementations, audio 136 may include audio corresponding to a plurality of text media, and each audio may be identified by a unique text medium ID. A user of media player device 120 may have the option to deactivate certain sounds, including, for example, the audible page-turn indicator and other sounds. In some implementations, audio 136 may be completely downloaded and stored in media player device 120, or audio 136 may be streamed to media player device 120 over network 185 from server 190, while audio 136 is being played over audio output 170.

Visual content 138 may include still images, graphics, video clips, or other visual content that may be associated with text medium 110. In some implementations, visual content may include an image of the cover of text medium 110, which media player device 120 may display while playing audio 136. In some implementations, visual content 138 may include still pictures corresponding to illustrations in text medium 110, or still pictures associated with text medium 110. For example, text medium 110 may include words and no pictures, and visual content 138 may include images to complement the words. In some implementations, visual content 138 may include a page number corresponding to the current page of text medium 110. Visual content may include a non-numeric graphic corresponding to the current playback page of text medium 110 so that pre-literate children may identify the location in text medium 110 corresponding to the current playback of audio 136.

Playback module 140 may play audio 136 and/or visual content 138 on media player device 120. Playback module 140 may enable a user to start, stop, pause, and restart playback of audio 136. In some implementations, playback module 140 may play audio 136 over audio output 170 by pronouncing the plurality of words appearing in text medium 110 in the sequence in which the words appear. Playback module 140 may begin playback at the beginning of audio 136, and the beginning of audio 136 may correspond to the beginning of text medium 110. In some implementations, after receiving the text medium ID and before beginning playback, playback module 140 may search for a bookmark location associated with the text medium ID in memory 130. If playback module 140 locates a bookmark location in memory 130, playback module 140 may continue playing audio 136 from the bookmark location. When playback module 140 begins playback at a bookmark location, a playback location, or any location other than the beginning of text medium 110, playback module may prompt the user where playback is beginning. In some implementations, the prompt may include an auditory signal such as a pronunciation of the page number or another description of page on which playback module 140 will begin. In some implementations, the prompt may include a visual prompt displaying the page number or non-numeric graphic corresponding to the page on which playback will begin.

Bookmark module 145 may create a bookmark location corresponding to a position of a last played word in audio 136, and store the bookmark location in memory 130, the bookmark location corresponding to the text medium ID of the audio being played. When a user begins playback of audio 136 and stops or pauses playback before the end of audio 136, bookmark module 145 may store the location at which the user stopped as a bookmark location in memory 130. In some implementations, the bookmark location may correspond to the last word played, so that when playback module 140 resumes, playback begins at the next word in audio 136. In some implementations, the bookmark location may correspond to the beginning of the page on which the last word played appears, so that when playback module 140 resumes, playback begins at the beginning of the page on which the last word played appears, thus avoiding beginning playback in the middle of a sentence.

Handoff module 150 may enable playback of audio 136 to seamlessly transfer from one media player device to another media player device. Handoff module 150 may be configured to identify a playback location in audio 136 corresponding to the current playback location in audio 136. In some implementations, media player device 120 may connect to network 185, and a second media player device (not shown) may be connected to network 185. Handoff module 150 may receive, via network 185, a playback location in the audio corresponding to the text medium ID from the second media player device (not shown), the playback location corresponding to a current location of the audio corresponding to the text medium ID being played by the second media player device (not shown). Media player device 120 may continue playback of audio 136 from the playback location.

Proximity module 155 may detect the proximity of text medium 110. In some implementations, proximity module 155 may detect the proximity of text medium 110 and a second text medium (not shown). In some implementations, proximity module 155 may include a received signal strength indicator (RSSI) or a received channel power indicator (RCPI), and may use a received signal strength or a received channel power to detect the proximity of text medium 110 and the second text medium (not shown). Text medium 110 and the second text medium (not shown) may be different text media, and each text medium may have a unique text medium ID. Based on the detected proximity of text medium 110 and the second text medium (not shown), proximity module 155 may determine that either text medium 110 or the second text medium (not shown) is closer to media player device 120, and is therefore the closest text medium. In some implementations, proximity module 155 may detect more than one text medium, but be unable to determine that one is the closest text medium. In such a situation, display 175 may display a selectable list of detected text media, enabling the user to select the desired text medium from the list.

In some implementations, proximity module may detect text medium 110 and, in response to detecting text medium 110, media player device 120 may initiate a download of audio 136 corresponding to text medium 110 and store audio 136 in memory 130. In some implementations, media player device 120 may download audio 136 in the background, so that when a user subsequently attempts to use media player device 120 with text medium 110, audio 136 is already stored in memory 130. In some implementations, playback of audio 136 may require media player device 120 to be within a certain proximity of text medium 110. For example, when text medium 110 contacts media player device 120, or when text medium 110 is within about one inch of media player device 120, or within two inches, five inches, one foot, five feet, or any distance that is a combination of the enumerated distances up to about fifty feet. In some implementations, once playback module 140 initiates playback of audio 136, playback may continue until the end of audio 136, and playback cannot be restarted unless media player device 120 is within a certain proximity to text medium 110. In some implementations, playback of audio 136 may only be initiated when media player device 120 is within a certain proximity of text medium 110, and playback may terminate when media player device 120 ceases to be within that proximity of text medium 110.

Processor 160 may access memory 130 to store received input or to execute commands, processes, or programs stored in memory 130. Processor 160 may be a microprocessor or a similar hardware processor used in a computing device.

Audio input device 165 may include a microphone. In some implementations, audio input device 165 may be used to receive a transmission from text medium 110. For example, wireless communication element 111 may send an audio signal including a text medium ID corresponding to text medium 110. In some implementations, such an audio signal may be inaudible to humans, for example, an audio signal having a frequency greater than about 20 kHz. Audio input device 165 may include a microphone that may detect audio signals having a frequency greater than about 20 kHz.

Audio output 170 may include a speaker, a plurality of speakers, or another device suitable for audio output. In some implementations, audio output 170 may be used to play audio 136, such that a user of media player device 120 will hear the pronunciation of the plurality of words in the same sequence they appear on a page of text medium 110. Display 175 may be a display of a user device such as a television display, a computer display, a tablet computer display, a display of a smart phone, or any other display suitable for displaying visual content 138.

Optical input 175 may include a camera, a scanner, or other device suitable for receiving optical input. In some implementations, media player device 120 may use optical input device 175 to scan a barcode or a QR code of text medium 110. In some implementations, optical input 175 may capture an image of text medium 110, such as an image of the cover of a book. In some implementations, text medium ID may be included in an image of text medium 110. Media player device 175 may use information obtained using optical input 175 to uniquely identify text medium 110 by comparing the information or the image with corresponding information or images in a database stored in media player device 120 or server 190.

Media player device 120 may include communication port 180. In some implementations, media player device 120 may be connectable through wired connection or wireless connection. Communication port 180 may be used to communicate with other devices, for example, for updating audio 136, visual content 138, or any other content, program, or module in memory 130. Communication port 180 may be configured to connect media player device 120 to text medium 110, a computer, or computer network 185. In some implementations, communication port 180 may be configured to receive a communication cable such as a universal serial bus (USB) port, Firewire port, Ethernet cable port, telephone cable port, HDMI port. In some implementations, communications port 180 can be configured to receive a transferable memory device, such as an SD card, mini SD card, micro SD card, USB memory device (thumb drive), a memory stick, or other configurations of transferable memory known in the art. In some implementations, communication port 180 may communicate wirelessly, such that media player device 120 may be wirelessly connectable to a computer or computer network using WiFi, cellular, Bluetooth®, or other wireless technologies known in the art. Communication port 180 may include a wireless receiver, such as an RFID receiver, an NFC receiver, a BT receiver or a BLE receiver, where BLE receivers include, among other things, Bluetooth Smart and iBeacon™ receivers.

Network 185 may be a computer network, such as a local area network (LAN), a wide area network (WAN), the Internet, or any other type of computer network. Server 190 may be a server suitable for storing and providing a plurality of audio files corresponding to a plurality of text medium IDs, and connecting to media player device 120 directly or indirectly, for example, via network 185.

Figure 2:
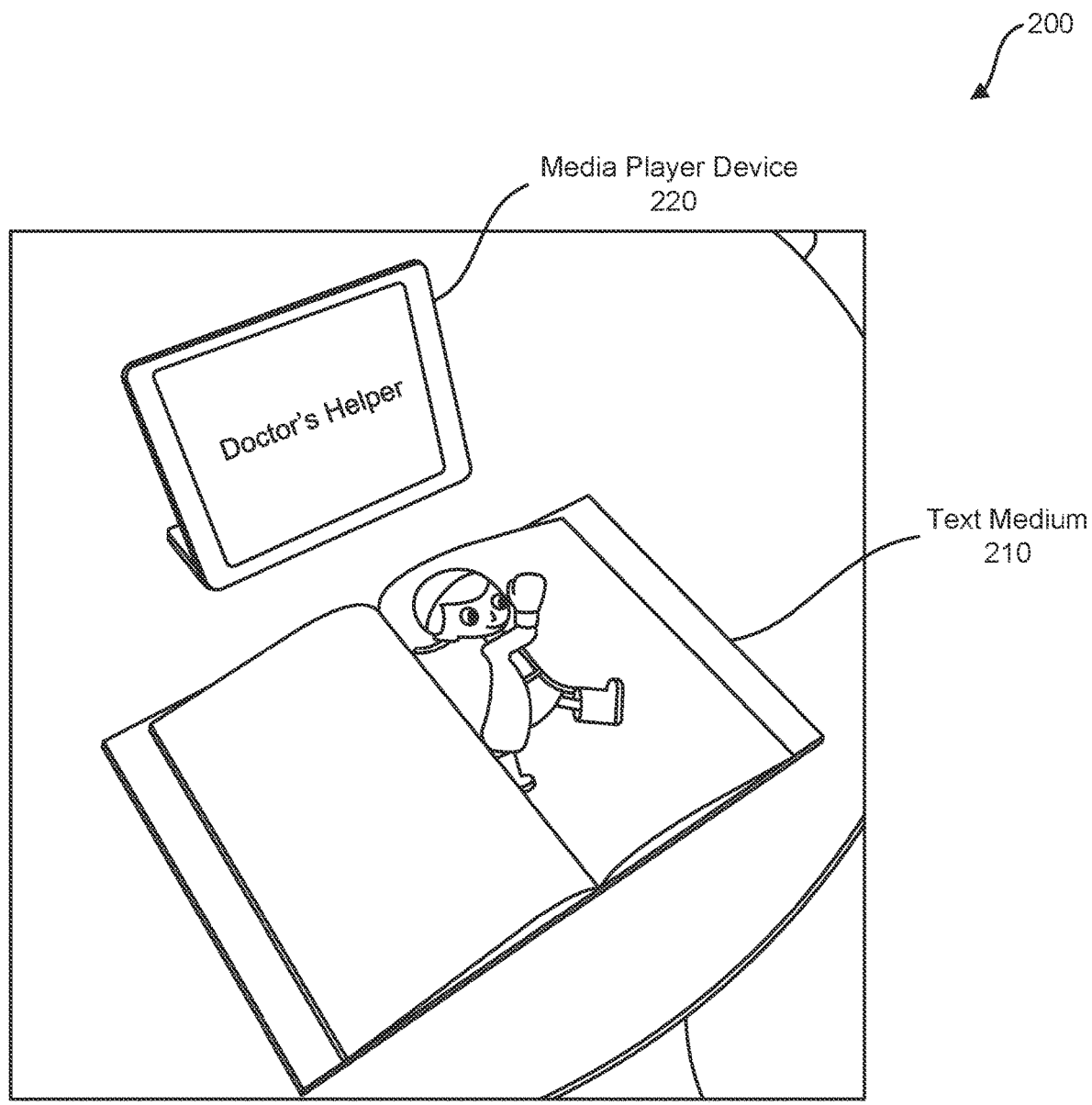
FIG. 2 shows the media player device of FIG. 1 being used with an exemplary text medium, according to one implementation of the present disclosure.

FIG. 2 shows the media player device of FIG. 1 for use with an exemplary text medium, according to one implementation of the present disclosure. Text medium 210 may include a plurality of pages, and the plurality of pages may include a plurality of words in a sequence, for example, a children's storybook. In some implementations, the plurality of pages may include images, such as illustrations and/or pictures. As shown in FIG. 2, media player device 220 is a tablet computer. However, media player device 220 may be a phone, such as a smart phone, a computer, a television, such as a smart television, a personal music player, such as an iPod®, or any device suitable for receiving a text medium ID from text medium 210 and play audio 136.

Figure 3:
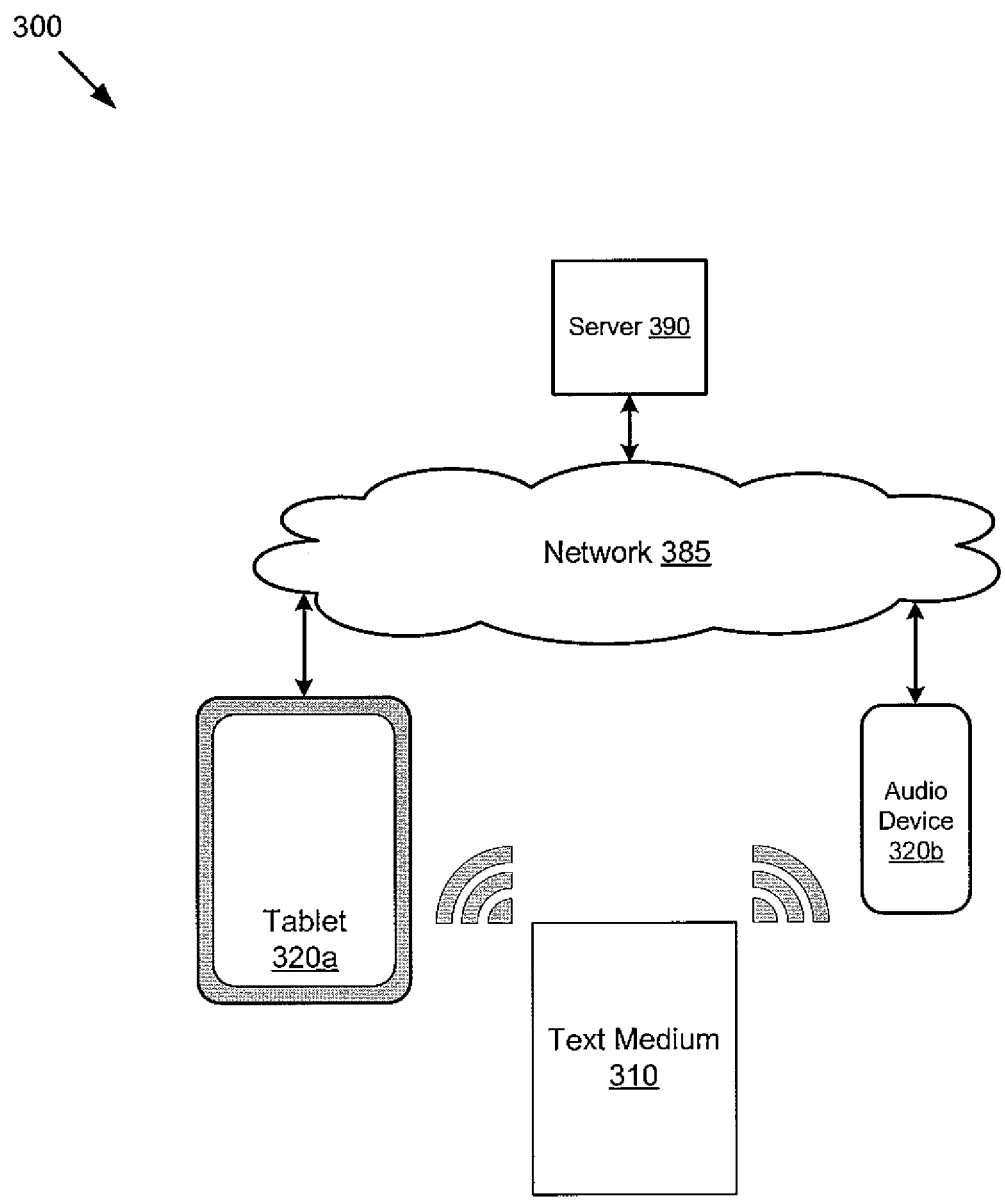
FIG. 3 shows a diagram of an exemplary text medium for use with a plurality of exemplary media player devices in communication with a server through a network, according to one implementation of the present disclosure.

FIG. 3 shows a diagram of an exemplary book for use with a plurality of exemplary media player devices in communication with a server through a network, according to one implementation of the present disclosure. Text medium 310 may transmit a wireless signal including a text medium ID uniquely identifying text medium 310. In some implementations, a user may be using audio device 320b to play audio 136 corresponding to text medium 310 and desire to transfer play of audio 136 to tablet 320*a*. Accordingly, audio device 320*b* may handoff playback of audio 136 to tablet 320*a*.

As shown in FIG. 3, audio device 320*b* and tablet 320*a* are connected to network 385, and network 385 is connected to server 390. Audio device 320*b* may receive a wireless signal transmitted by text medium 310, including a text medium ID uniquely identifying text medium 310. Additionally, tablet 320*a* may receive the wireless signal transmitted by text medium 310, including the text medium ID uniquely identifying text medium 310. In some implementations, audio device 320*b* may transmit the text medium ID to server 390 over network 385, and in response to transmitting the text medium ID, audio device 320*b* may receive audio 136 corresponding to the text medium ID from server 390. In some implementations, audio device 320*b* may transmit a playback location in audio 136 corresponding to the current location of audio 136 being played by audio device 320*b*. Tablet 320*a* may receive the playback location transmitted by audio device 320*b* over network 385. Tablet 320*a* may continue playback of audio 136 from the playback location received from audio device 320*b*, thus creating a seamless handoff from audio device 320*b* to tablet 320*a* and allowing the user to enjoy an uninterrupted playback of audio 136. Audio 136 may be stored in the memory of tablet 320*a*, audio device 320*b*, and/or server 390. In some implementations, one or both media player devices tablet 320*a* and audio device 320*b* may include audio 136 corresponding to text medium 310 in a local memory. In some implementations, one or both media player devices tablet 320*a* and audio device 320*b* may stream audio 136 corresponding to text medium 310 over network 385 from server 390.

Figure 4:
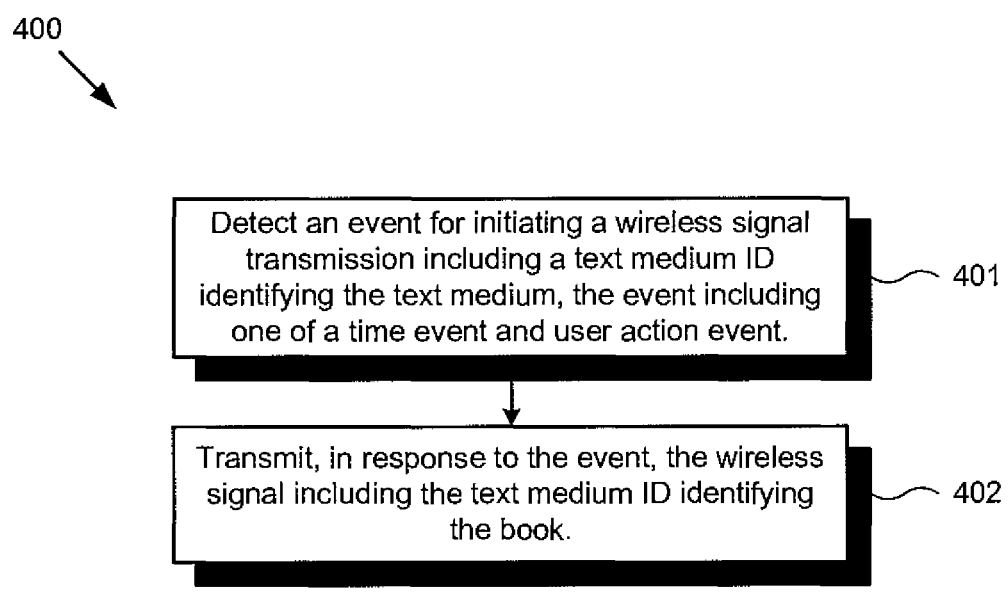
FIG. 4 shows an exemplary flowchart illustrating a method for use by an exemplary text medium for transmitting information corresponding to the text medium, according to one implementation of the present disclosure.

FIG. 4 shows an exemplary flowchart illustrating a method for use by an exemplary text medium for transmitting information corresponding to the text medium, according to one implementation of the present disclosure.

At 401, text medium 110 detects an event for initiating a wireless signal transmission including a text medium ID identifying the text medium, the event including one of a time event and a user action event. In some implementations, an event for initiating a wireless signal transmission, including a text medium ID identifying the text medium, may include operation of a power switch. In some implementations, the power switch may be embedded in the cover of text medium 110, and opening the cover by a user may automatically operate the switch. The switch may include a mechanical angle slider that operated by opening the cover of text medium 110, a mechanical switch operated by opening the cover of text medium 110, a proximity switch operated by opening the cover of text medium 110. In some implementations, wireless communication element 111 may be a passive or active device, such as an RFID transmitter, and may be activated by electromagnetic induction caused by magnetic fields produced near wireless communication element 111. An event for initiating a wireless transmission including a text medium ID may include bringing the RFID tag within a proximity of an RFID tag reader. In some implementations, the user may manually press a button for initiating a wireless transmission of the text medium ID by wireless communication element 111. In another implementation, wireless communication element 111 may transmit the text medium ID at predetermined intervals, e.g. every one second.

Once wireless communication element 111 is activated, at 402, wireless communication element 111 transmits a text medium ID uniquely identifying text medium 110. The text medium ID may be transmitted as part of a radio signal or an audio signal. In some implementations, wireless communication element 111 may transmit the signal once or a number of times at predetermined intervals, such as every hundred milliseconds. The text medium ID is used by media player 120 or server 190 to identify audio 136 corresponding to text medium 110, for example, by searching a database of text medium IDs associated with corresponding audio books.

Figure 5:
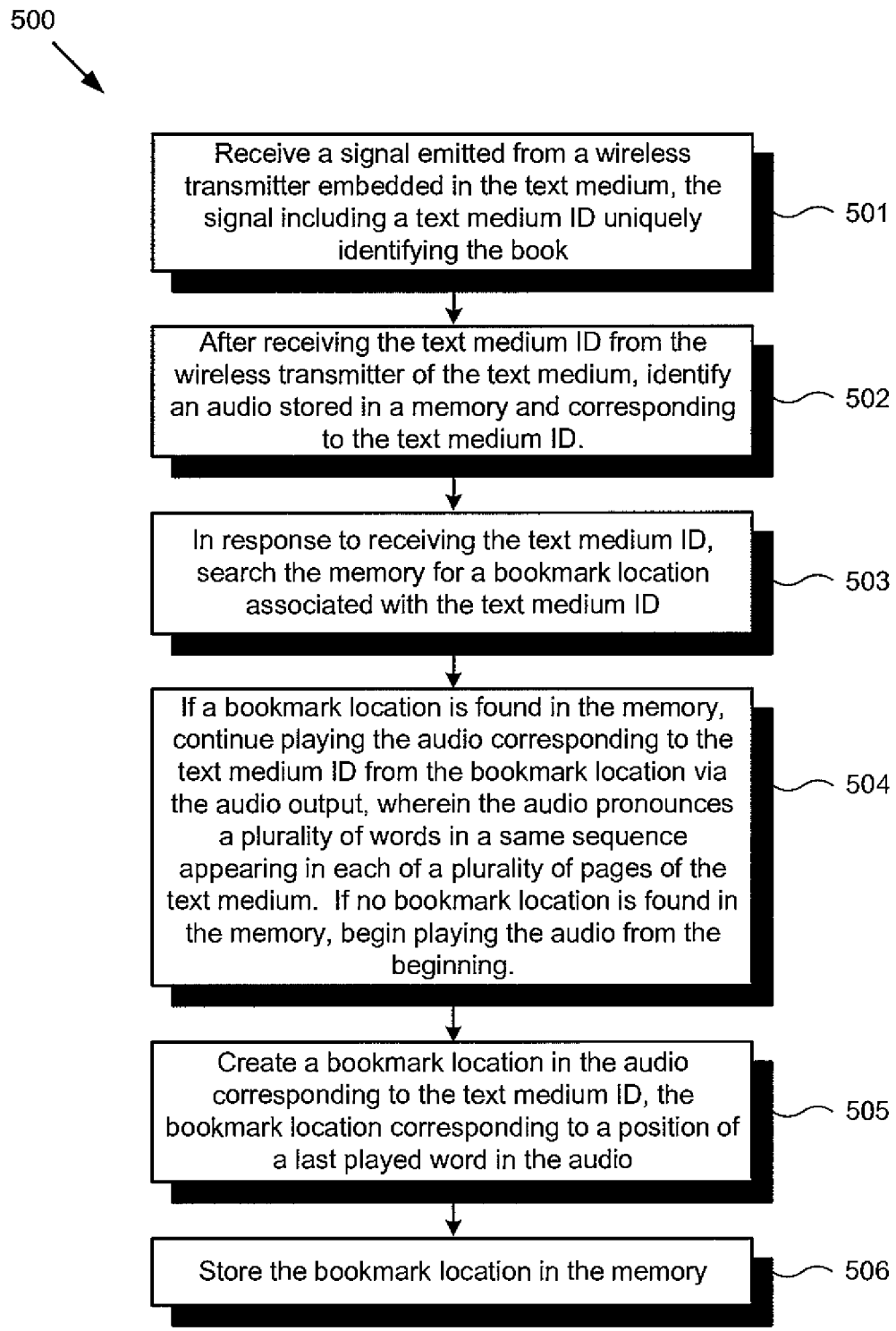
FIG. 5 shows an exemplary flowchart illustrating a method of playing an audio, according to one implementation of the present disclosure.

FIG. 5 shows an exemplary flowchart illustrating a method of playing an audio, according to one implementation of the present disclosure. In some implementations, the audio may also include a corresponding visual content, such as a video or images.

At 501, media player device 120 receives a signal emitted from wireless communication element 111 embedded in text medium 110, the signal including a text medium ID uniquely identifying text medium 110. In some implementations, media player device 120 may receive the signal using communication port 180, or audio input 165. The signal may be an RFID signal, an NFC signal, a BT signal, a BLE signal. The signal may also be an audio signal emitted by an audio output, such as a speaker. In some implementations, media player device 120 may use a camera to scan a barcode or a cover of a book to identify the book.

At 502, after receiving the text medium ID from wireless communication element 111 or other identifying information, media player device 120 identifies audio 136 stored in memory 130, where audio 136 corresponds to the text medium ID. In some implementations, media player device 120 may transmit the text medium ID to server 190, and server 190 may identify an audio corresponding to the text medium ID and transmit such audio to media player device 120.

At 503, in response to receiving the text medium ID, media player device 120 searches memory 130 for a bookmark location associated with the text medium ID. A bookmark location may correspond to a last played word in audio 136. If there are a number of users, each user may have a corresponding bookmark location associated with the user.

At 504, if a bookmark location is found in memory 130, media player device 120 continues playing audio 136 corresponding to the text medium ID from the bookmark location via audio output 170, wherein audio 136 pronounces a plurality of words in a same sequence appearing in each of a plurality of pages of text medium 110. In some implementations, a user may be given an option to override a bookmark location and begin playback from the beginning of audio 136 or any other user selected location in the book. If no bookmark location is found in memory 130, media player device 120 may begin playing audio 136 from the beginning or any other user selected location in the book.

At 505, in response to a user request for creating a bookmark or automatically upon termination of playing the audio, media player device 120 creates a bookmark location in audio 136, the bookmark location corresponding to the position of the last played word in audio 136. In some implementations, media player device 120 may create a bookmark location corresponding to the last word played before media player device 120 is paused, stopped, or powered off.

At 506, media player device 120 stores the bookmark location in memory 130. In some implementations, when media player device 120 creates multiple bookmark locations as audio 136 plays, each successive bookmark location created replaces the last bookmark location created. In some implementations, media player device 120 may only store one bookmark location corresponding to a text medium ID in memory 130.

Figure 6:
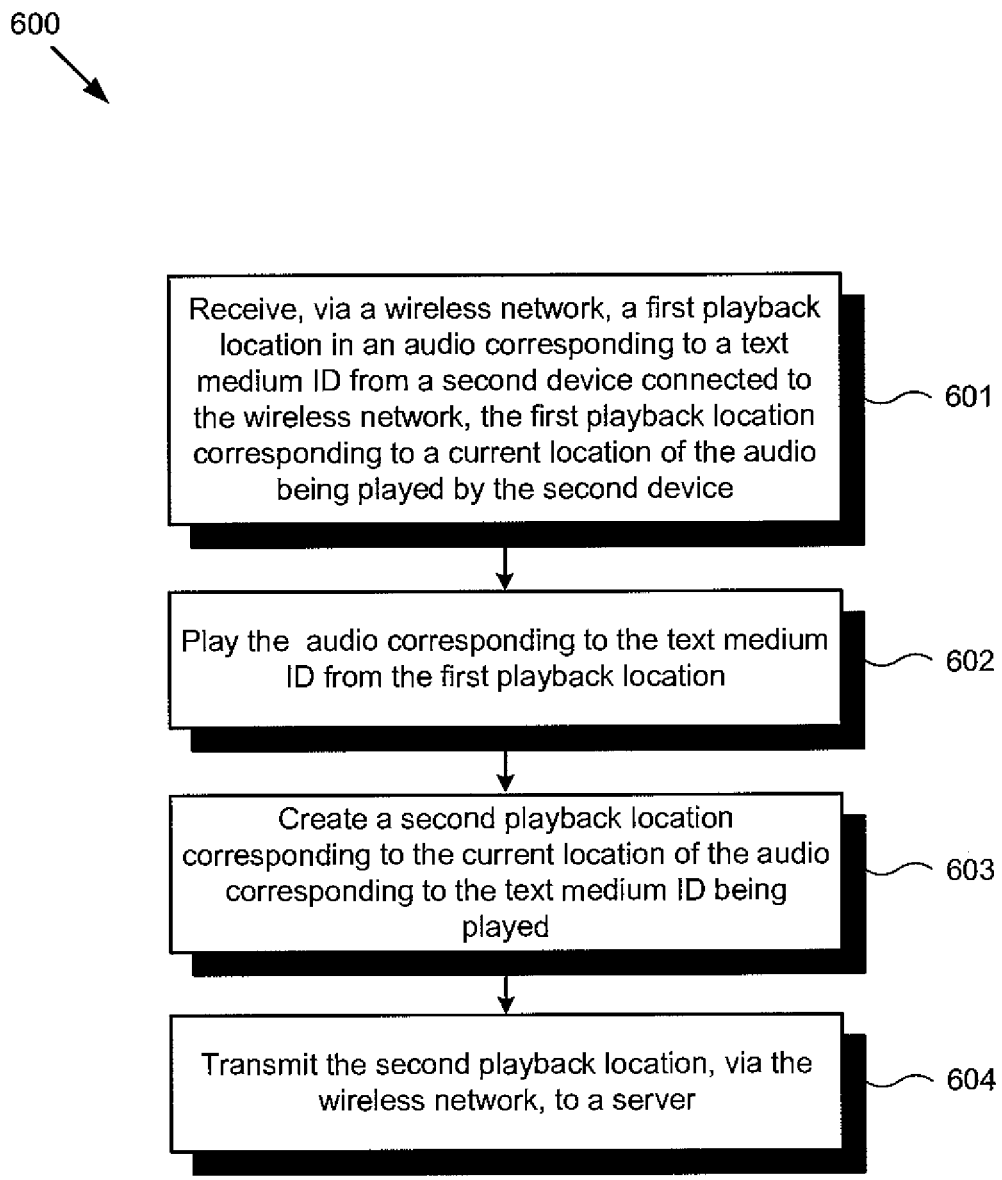
FIG. 6 shows an exemplary flowchart illustrating a method of playing an audio corresponding to a text medium, according to one implementation of the present disclosure.

FIG. 6 shows an exemplary flowchart illustrating a method of playing an audio, according to one implementation of the present disclosure. Media player device 120 may seamlessly transition playback of audio 136 by a handoff from a second media player device, the second media player device currently playing audio 136. In some implementations, the audio may also include a corresponding visual content, such a video or images.

At 601, media player device 120 receives, via network 185, a first playback location in audio 136 from the second media player device connected to network 185, the first playback location corresponding to a current location of audio 136 being played by the second media player device.

At 602, media player device 120 plays audio 136 from the first playback location, enabling seamless transition of audio 136 as playback is transferred from the second media player device to media player device 120.

At 603, media player device 120 creates a second playback location corresponding to the current location of audio 136 being played by media player device 120. In some implementations, the second playback location may be created to enable a handoff from media player device 120 to another media player device. In some implementations, creation of the second playback location may not interrupt or otherwise affect playback of audio 136 on media player device 120.

At 604, media player device 120 transmits the second playback location, via the wireless network, to server 190 and/or another media player device connected to network 185 to enable handoff of playback of audio 136. In some implementations, transmission of the second playback location may not interrupt or otherwise affect playback of audio 136 on media player device 120. In some implementations, playback of audio 136 on media player device 120 will terminate when playback of audio 136 is handed off to another media player device.

Figure 7:
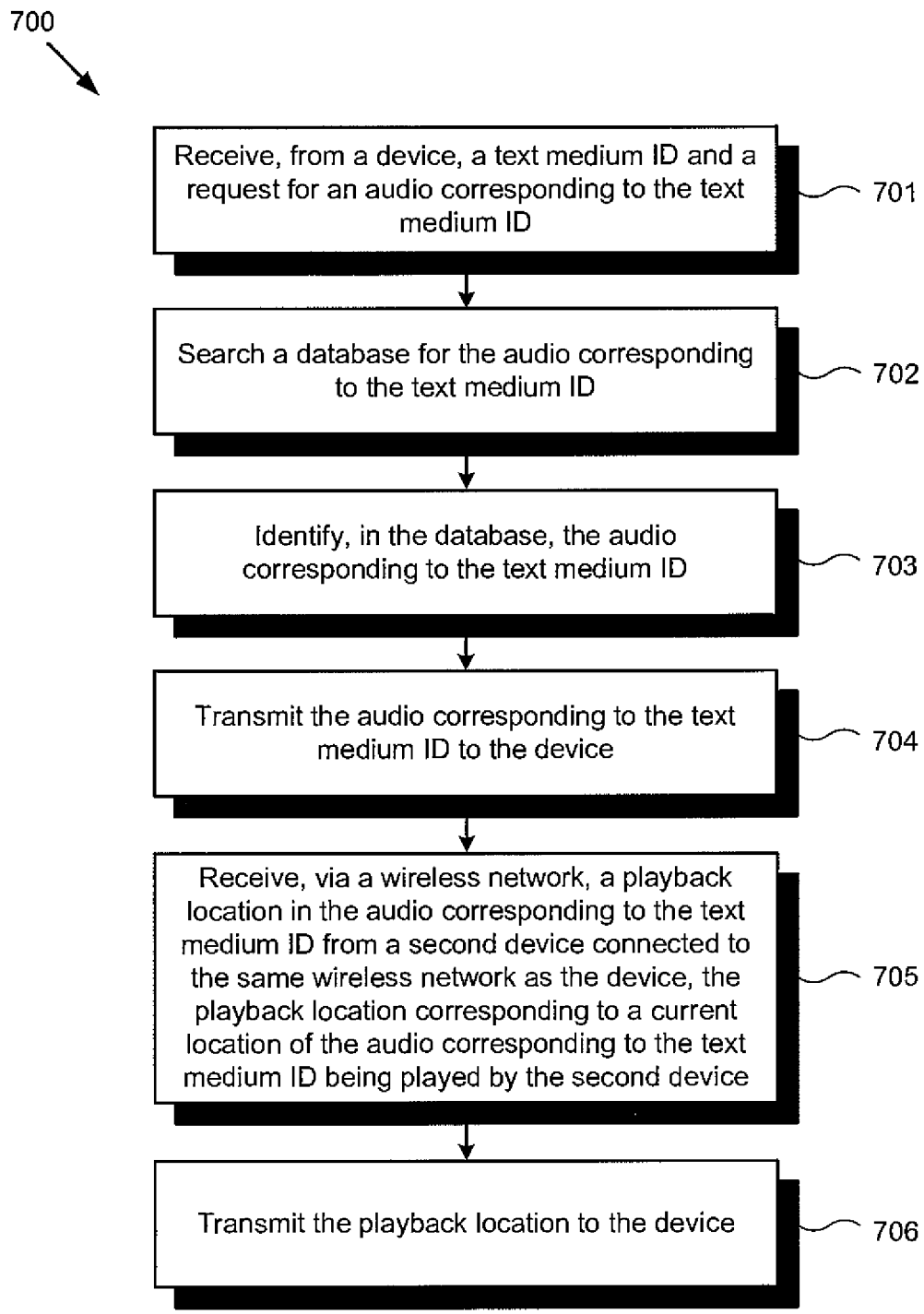
FIG. 7 shows an exemplary flowchart illustrating a method of receiving an audio corresponding to a text medium from a server, according to one implementation of the present disclosure.

FIG. 7 shows an exemplary flowchart illustrating a method of receiving an audio from a server, according to one implementation of the present disclosure. In some implementations, the audio may also include a corresponding visual content, such a video or images.

At 701, server 190 receives, from a media player device, a text medium ID and a request for an audio corresponding to the text medium ID. In some implementations, server 190 may have a plurality of audios corresponding to a plurality of text medium IDs stored in a server memory. Server 190 may include a database of each audio stored thereon and the text medium ID corresponding to each audio.

At 702, server 190 searches the database for the audio corresponding to the text medium ID. At 703, server 190 identifies, in the database, the audio corresponding to the text medium ID. At 704, server 190 transmits the audio corresponding to the text medium ID to the media player device. Server 190 may also determine a bookmark location associated with the audio, and begin a streaming of the audio from the bookmark location.

In addition to providing the audio corresponding to the text medium ID for playback on the media player device, server 190 may provide playback information corresponding to a handoff between a second media player device and the media player device. At 705, server 190 receives, via a wireless network, a playback location in the audio corresponding to the text medium ID from the second media player device connected to the same wireless network as the media player device, the playback location corresponding to a current location of the audio corresponding to the text medium ID being played by the second media player device.

At 706, server 190 transmits the playback location to the media player device. In some implementations, the first media player device may use the playback location as a starting point for playing the audio corresponding to the text medium ID, thus enabling an uninterrupted handoff of playback of the audio corresponding to the text medium ID between the second media player device and the media player device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A media player device comprising:
an audio output;
a display;
a memory storing an audio book application software; and
a processor configured to execute the audio book application software to:
receive, using a playback module of the audio book application software, a text medium ID uniquely identifying a text medium having a plurality of pages each having a plurality of words;
locate, using a bookmark module of the audio book application software, in response to receiving the text medium ID, a bookmark location in the memory associated with a user of a plurality of users associated with the text medium ID;
detect, using a proximity module of the audio book application software, a proximity of the media player device to the text medium;
initiate play of an audio, using the playback module of the audio book application software only when the media player device is within a predetermined proximity of the text medium, starting from the bookmark location associated with the user, wherein the audio corresponds to the text medium ID and pronounces words corresponding to the plurality of words in a same sequence appearing in the plurality of pages, and wherein the bookmark location corresponds to a location prior to a word last played to avoid playing the audio from a middle of a sentence;
continue play of the audio until an end of the audio, whether or not the media player device remains within the predetermined proximity of the text medium during the continued play of the audio; and
display, on the display, a non-numeric graphic of an illustration or a still picture corresponding to a current playback page of the text medium so as to identify a location in the text medium corresponding to the current playback of the audio.

2. The media player device of claim 1, wherein the memory includes the text medium ID, and wherein after receiving the text medium ID, the processor is further configured to execute the audio book application software to:
  identify the audio stored in the memory and corresponding to the text medium ID.

3. The media player device of claim 1, wherein after receiving the text medium ID, the processor is further configured to execute the audio book application software to:
  transmit the text medium ID to a server over a network; and
  receive, from the server and in response to transmitting the text medium ID, the audio corresponding to the text medium ID.

4. The media player device of claim 1, wherein prior to receiving the first signal, the processor is further configured to execute the audio book application software to:
  create the bookmark location in the audio corresponding to the user associated with the text medium ID, the bookmark location corresponding to a position of a last played word in the audio; and
  store the bookmark location in the memory.

5. The media player device of claim 1, wherein the processor is further configured to execute the audio book application software to:
  display, in response to receiving the text medium ID, a video clip corresponding to the text medium ID on the display.

6. The media player device of claim 1, wherein each of the plurality of words is a printed word on a page.

7. A method for use by a media player device having an audio output, a memory storing an audio book application software, a display and a processor, the method comprising:
  receiving, using the processor executing a playback module of the audio book application software, uniquely identifying a text medium having a plurality of pages each having a plurality of words;
  locating, in response to receiving the text medium ID, using the processor executing a bookmark module of the audio book application software, a bookmark location in the memory associated with a user of a plurality of users associated with the text medium ID;
  detecting, using the processor executing a proximity module of the audio book application software, a proximity of the media player device to the text medium;
  initiating play of an audio, using the processor executing the playback module of the audio book application software only when the media player device is within a predetermined proximity of the text medium, starting from the bookmark location associated with the user, wherein the audio corresponds to the text medium ID and pronounces words corresponding to the plurality of words in a same sequence appearing in the plurality of pages, and wherein the bookmark location corresponds to a location prior to a word last played to avoid playing the audio from a middle of a sentence;
  continuing play of the audio until an end of the audio, whether or not the media player device remains within the predetermined proximity of the text medium during the continued playing of the audio; and
  displaying, on the display, a non-numeric graphic of an illustration or a still picture corresponding to a current playback page of the text medium so as to identify a location in the text medium corresponding to the current playback of the audio.

8. The method of claim 7, wherein the memory includes the text medium ID, and wherein after receiving the text medium ID, the method further comprises:
  identifying, using the processor, the audio stored in the memory and corresponding to the text medium ID.

9. The method of claim 7, wherein after receiving the text medium ID, the method further comprises:
  transmitting, using the processor, the text medium ID to a server over a network; and
  receiving, from the server and in response to transmitting the text medium ID, the audio corresponding to the text medium ID.

10. The method of claim 7, wherein prior to receiving the first signal, the method further comprising:
  creating, using the processor, the bookmark location in the audio corresponding to the user associated with the text medium ID, the bookmark location corresponding to a position of a last played word in the audio; and
  storing the bookmark location in the memory.

11. The method of claim 7, further comprising:
  displaying, in response to receiving the text medium ID, a video clip corresponding to the text medium ID on the display.

12. The method of claim 7, wherein each of the plurality of words is a printed word on a page.

13. The media player device of claim 1, wherein the audio further comprises an audible page-turn indicator following the last word on a page of the text medium.

14. The media player device of claim 1, wherein the processor is further configured to execute the audio book application software to:
  generate, before playing the audio, an auditory prompt identifying the bookmark location.

15. The method of claim 7, wherein the audio further comprises an audible page-turn indicator following the last word on a page of the text medium.

16. The method of claim 7, further comprising:
  generating, before playing the audio, an auditory prompt identifying the bookmark location.

17. A media player device comprising:
  an audio output;
  a display;
  a memory storing an audio book application software; and
  a processor configured to execute the audio book application software to:
  receive, using a playback module of the audio book application software, a text medium ID uniquely identifying a text medium having a plurality of pages each having a plurality of words;
  locate, using a bookmark module of the audio book application software, in response to receiving the text medium ID, a bookmark location in the memory associated with a user of a plurality of users associated with the text medium ID;
  detect, using a proximity module of the audio book application software, a proximity of the media player device to the text medium;
  play, using the playback module of the audio book application software only when the media player device is within a predetermined proximity of the text medium, starting from the bookmark location associated with the user, wherein the audio corresponds to the text medium ID and pronounces words corresponding to the plurality of words in a same sequence appearing in the plurality of pages, and wherein the bookmark location corresponds to a location prior to a word last played to avoid playing the audio from a middle of a sentence; and display, on the display, a non-numeric graphic of an illustration or a still picture corresponding to a current playback page of the text medium so as to identify a location in the text medium corresponding to the current playback of the audio.

18. The media player device of claim 17, wherein the audio further comprises an audible page-turn indicator following the last word on a page of the text medium.

\* \* \* \* \*